(12) United States Patent
Gilmore et al.

(10) Patent No.: US 8,532,245 B2
(45) Date of Patent: Sep. 10, 2013

(54) CORE SHROUD CORNER JOINTS

(75) Inventors: Charles B. Gilmore, Greensburg, PA (US); David R. Forsyth, Cheswick, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 734 days.

(21) Appl. No.: 12/634,836

(22) Filed: Dec. 10, 2009

(65) Prior Publication Data

US 2010/0150298 A1  Jun. 17, 2010

Related U.S. Application Data

(60) Provisional application No. 61/138,140, filed on Dec. 17, 2008.

(51) Int. Cl.
- *G21C 5/08* (2006.01)
- *G21C 15/02* (2006.01)
- *G21C 5/00* (2006.01)
- *G21C 15/00* (2006.01)

(52) U.S. Cl.
USPC .......... 376/302; 376/207; 376/210; 376/211; 376/277; 376/347; 376/361; 376/395; 376/399

(58) Field of Classification Search
USPC ............... 376/277, 302, 303, 304, 245, 254, 376/260, 272, 282, 287–296, 347, 361, 362, 376/364, 395, 399, 400, 409, 457, 207, 210, 376/211
See application file for complete search history.

(56) References Cited

U.S. PATENT DOCUMENTS

| | | | | |
|---|---|---|---|---|
| 2,293,569 A | * | 8/1942 | Sonion | 52/71 |
| 3,663,366 A | * | 5/1972 | Sauar | 376/457 |
| 3,913,689 A | * | 10/1975 | Andersson et al. | 376/364 |
| 4,006,362 A | * | 2/1977 | Mollon et al. | 376/272 |
| 4,158,605 A | | 6/1979 | Cooper, Jr. et al. | |
| 4,199,403 A | * | 4/1980 | Puri et al. | 376/302 |
| 4,409,179 A | * | 10/1983 | Burger | 376/302 |
| 4,410,487 A | * | 10/1983 | Tautz et al. | 376/399 |
| 4,626,403 A | * | 12/1986 | Fabris | 376/272 |
| 4,654,188 A | * | 3/1987 | Hankinson | 376/260 |
| 4,701,299 A | * | 10/1987 | Alibran et al. | 376/302 |
| 4,812,286 A | * | 3/1989 | Gluntz | 376/282 |
| 4,925,624 A | * | 5/1990 | Chevereau et al. | 376/400 |
| 5,215,707 A | * | 6/1993 | Yates | 376/254 |

(Continued)

FOREIGN PATENT DOCUMENTS

| | | |
|---|---|---|
| DE | 28 18 886 B1 | 4/1979 |
| EP | 0 323 306 A1 | 7/1989 |
| EP | 0 472 461 A1 | 2/1992 |
| FR | 2 333 324 A1 | 6/1977 |
| FR | 2 539 244 A1 | 7/1984 |
| GB | 1 271 594 A | 4/1972 |

*Primary Examiner* — Bernarr Gregory
(74) *Attorney, Agent, or Firm* — Westinghouse Electric Company LLC; Joseph C. Spadacene

(57) ABSTRACT

A core shroud is provided, which includes a number of planar members, a number of unitary corners, and a number of subassemblies each comprising a combination of the planar members and the unitary corners. Each unitary corner comprises a unitary extrusion including a first planar portion and a second planar portion disposed perpendicularly with respect to the first planar portion. At least one of the subassemblies comprises a plurality of the unitary corners disposed side-by-side in an alternating opposing relationship. A plurality of the subassemblies can be combined to form a quarter perimeter segment of the core shroud. Four quarter perimeter segments join together to form the core shroud.

15 Claims, 12 Drawing Sheets

(56) References Cited

U.S. PATENT DOCUMENTS

| | | | |
|---|---|---|---|
| 5,257,295 A * | 10/1993 | Chevereau et al. | 376/302 |
| 5,392,322 A * | 2/1995 | Whitling et al. | 376/302 |
| 5,402,570 A * | 4/1995 | Weems et al. | 376/302 |
| 5,436,945 A * | 7/1995 | Weisel et al. | 376/302 |
| 5,729,581 A * | 3/1998 | Loock et al. | 376/302 |
| 5,737,378 A * | 4/1998 | Ballas et al. | 376/287 |
| 6,118,838 A * | 9/2000 | Robert et al. | 376/272 |

* cited by examiner

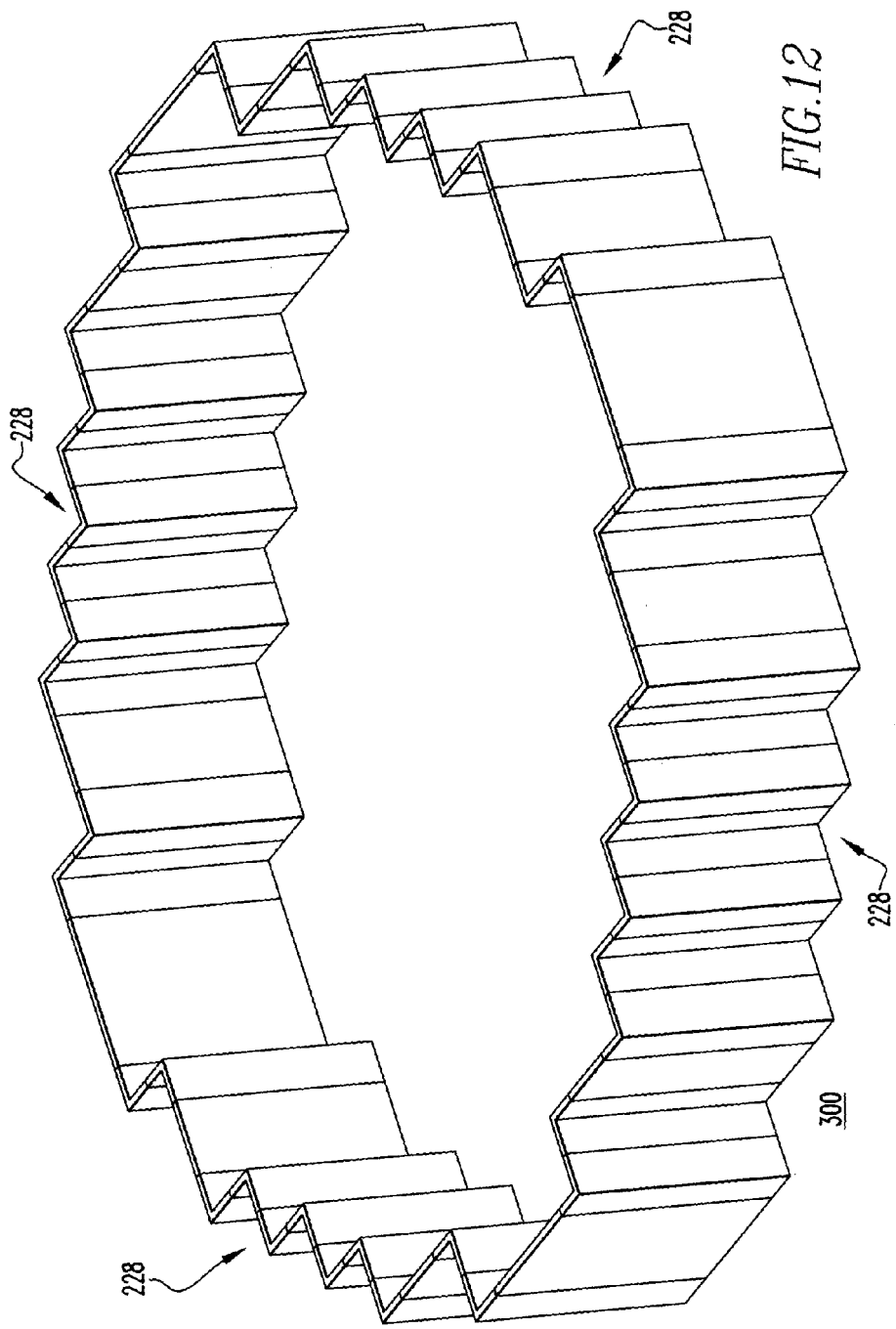

CORE SHROUD CORNER JOINTS

RELATED APPLICATION

This application claims the benefit of Provisional Application No. 61/138,140, filed on Dec. 17, 2008 and entitled, "Core Shroud Corner Joints."

GOVERNMENT INTEREST

This invention was made with government support under Contract No. DE-FC07-05ID14636 awarded by the Department of Energy. The government has certain rights in this invention.

BACKGROUND

1. Field

The disclosed concept relates generally to nuclear reactors and, more particularly, to core shrouds for nuclear reactors. The disclosed concept also relates to an associated method of assembling core shrouds.

2. Background Information

The primary side of nuclear reactor power generating systems which are cooled with water under pressure, comprises a closed circuit that is isolated from and in heat-exchange relationship with a secondary side for the production of useful energy.

FIG. 1 shows a simplified nuclear reactor primary system, including a generally cylindrical reactor pressure vessel 10 having a closure head 12 (also shown in FIG. 2) enclosing a nuclear core 14. A liquid reactor coolant, such as water, is pumped into the vessel 10 by pumps 16 through the core 14 where heat energy is absorbed and is discharged to a heat exchanger 18, typically referred to as a steam generator, in which heat is transferred to a utilization circuit (not shown), such as a steam-driven turbine generator. The reactor coolant is then returned to the pump 16, completing the primary loop. Typically, a plurality of the above-described loops are connected to a single reactor vessel 10 by reactor coolant piping 20.

FIGS. 2 and 3 show simplified side elevation and top plan views, respectively, of the pressure vessel 10, and both show portions of the pressure vessel 10 in section view. The core 14 is comprised of a plurality of parallel, vertical co-extending fuel assemblies 22, only two of which are shown in FIG. 2 for ease of illustration. For purposes of this description, the other vessel internal structures can be divided into the lower internals 24 and the upper internals 26 (both shown in FIG. 2). In conventional designs, the lower internals 24 function to support and align the core and guide instrumentation, as well as direct flow within the vessel 10. The upper internals 26 restrain or provide a secondary restraint for the fuel assemblies 22, and support and guide instrumentation and core components, such as control rods 28. In operation, coolant enters the vessel 10 through one or more inlet nozzles 30, flows downward through an annulus between the vessel 10 and the core barrel 32, is turned about 180° in a lower plenum 34, passes upwardly through a lower core support plate 37 and a lower core plate 36 upon which the fuel assemblies 22 are seated, and through and about the fuel assemblies 22. In some designs the lower core support plate 37 and lower core plate 36 are replaced by a single structure. The coolant flow through the core and surrounding area 38 is typically large, on the order of 400,000 gallons per minute at a velocity of approximately 20 feet per second. The resulting pressure drop and frictional forces tends to cause the fuel assemblies to rise, which movement is restrained by the upper internals 26, including a circular upper core plate 40. Coolant exiting the core 14 flows along the underside of the upper core plate 40 and upwardly through a plurality of perforations 42. The coolant then flows upwardly and radially to one or more outlet nozzles 44.

As shown in simplified form in FIG. 3, a core shroud 17 is positioned inside the circular core barrel 32, and includes a plurality of vertically extending plates 19 that convert the inner profile of the core barrel 32 to a stepped circumferential profile that generally matches the peripheral outline of the fuel assemblies 22 (shown in simplified form in FIG. 3) within the core 14. The simplified cross-section view of FIG. 3 also shows a thermal shield 15, which is interposed between the pressure vessel 10 and core barrel 32. Some plants have neutron pads in lieu of the thermal shield.

Typically, the plates 19 that form the stepped circumferential profile are substantially flat and abut at right angles at intersecting, corner, locations. As a result of machining and/or forming, some reactor vessel internals, however, include atypical corner joints. By way of example, these atypical corner joints can be characterized as being round for outside corner locations, being "key-like" (e.g., without limitation, having a groove) for interior locations and/or having relatively large pockets of open areas. Each atypical corner joint provides an area for flow to bypass the adjacent fuel assembly due to the low hydraulic resistance in these corners. In fact, flow calculations have shown a relatively high axial velocity in atypical core shroud corners. Among other disadvantages, this may result in unacceptable fuel rod vibration, which leads to fuel assembly grid-to-rod fretting, and may also cause elevated cross-flow velocities in this region.

There is, therefore, room for improvement in core shrouds and corner joints therefor.

SUMMARY

These needs and others are met by embodiments of the disclosed concept, which provide an improved design and assembly method for nuclear reactor core shrouds wherein, among other benefits, the corners of the core shroud assembly are preferably of a unitary design comprising one single continuous piece of material that is devoid of any seems or associated gaps or voids.

As one aspect of the disclosed concept, a core shroud is provided. The core shroud comprises: a number of planar members; a number of unitary corners; and a number of subassemblies each comprising a combination of the planar members and the unitary corners.

Each of the unitary corners may be substantially identical. Each of the unitary corners may comprise a unitary extrusion including a first planar portion and a second planar portion disposed perpendicularly with respect to the first planar portion. At least one of the subassemblies may comprises a plurality of the unitary corners, wherein the first planar portion of one of the unitary corners is joined to the second planar portion of another one of the unitary corners, in order that the unitary corners are disposed side-by-side in an alternating opposing relationship.

As another aspect of the disclosed concept, a nuclear reactor is provided which comprises: a pressure vessel; an annular core barrel seated within and supported by the pressure vessel; and a core shroud supported within the core barrel, the core shroud comprising: a number of planar members, a number of unitary corners, and a number of subassemblies each comprising a combination of the planar members and the unitary corners.

The core shroud may further comprise a number of flow deflectors, and each of the unitary corners of the core shroud may include a curved interior junction and a curved exterior junction. Each of the flow deflectors may include a curved portion and a number of substantially flat portions disposed opposite the curved portion, wherein the curved portion is structured to mate with a corresponding one of the curved interior junction and the curved exterior junction. The nuclear reactor may further comprise a number of grids disposed within the core shroud, wherein the substantially flat portions of the flow deflectors are structured to engage and support a portion of a corresponding one of the grids.

As a further aspect of the disclosed concept, a method of assembling a core shroud is provided. The method comprises: providing a number of planar members; extruding a plurality of unitary corners; joining a combination of the planar members and the unitary corners to form a number of subassemblies; and joining a plurality of the subassemblies to form at least a portion of the core shroud.

The method may further comprise joining a plurality of the subassemblies to form a quarter perimeter segment of the core shroud, and may still further comprise joining four of the quarter perimeter segments to form the core shroud.

BRIEF DESCRIPTION OF THE DRAWINGS

A further understanding of the disclosed concept can be gained from the following description of the preferred embodiments when read in conjunction with the accompanying drawings in which:

FIG. 12 is an isometric view of a complete core shroud assembly in accordance with the disclosed concept;

DESCRIPTION OF THE PREFERRED EMBODIMENTS

Figure 1:
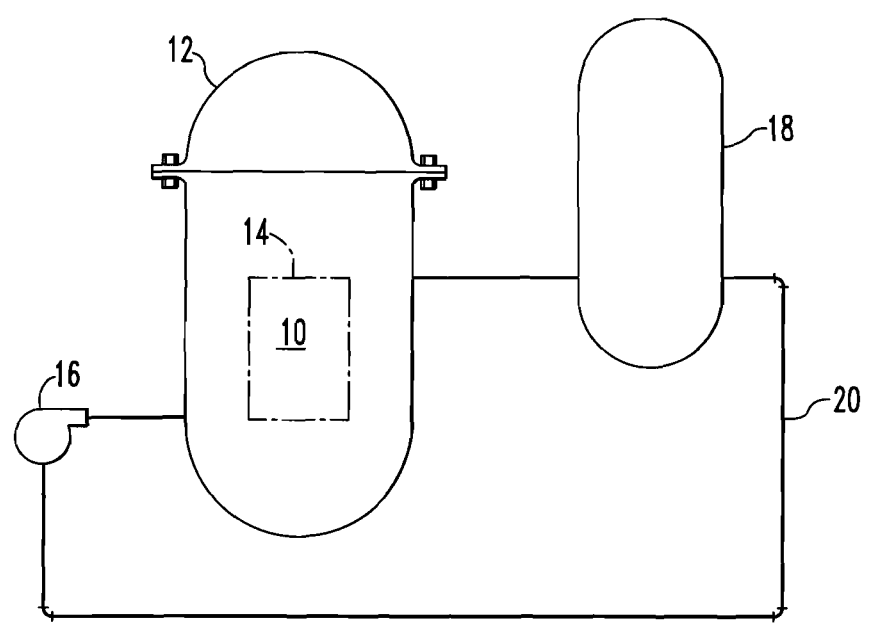
FIG. 1 is a simplified schematic of a portion of a nuclear reactor to which the disclosed concept may be applied.
Figure 2:
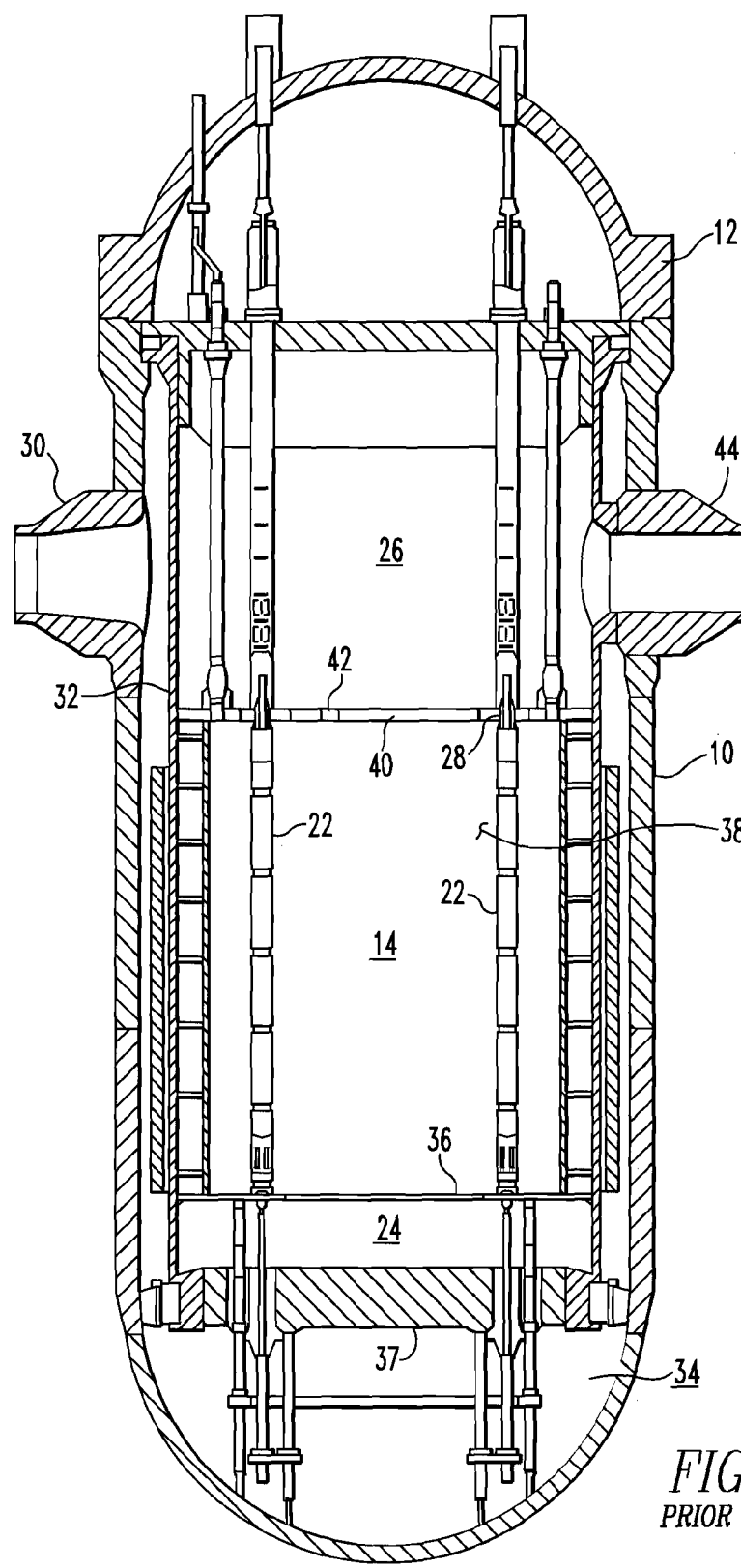
FIG. 2 is an side elevation view, partially in section, of a nuclear reactor vessel and internal components to which the disclosed concept may be applied.
Figure 3:
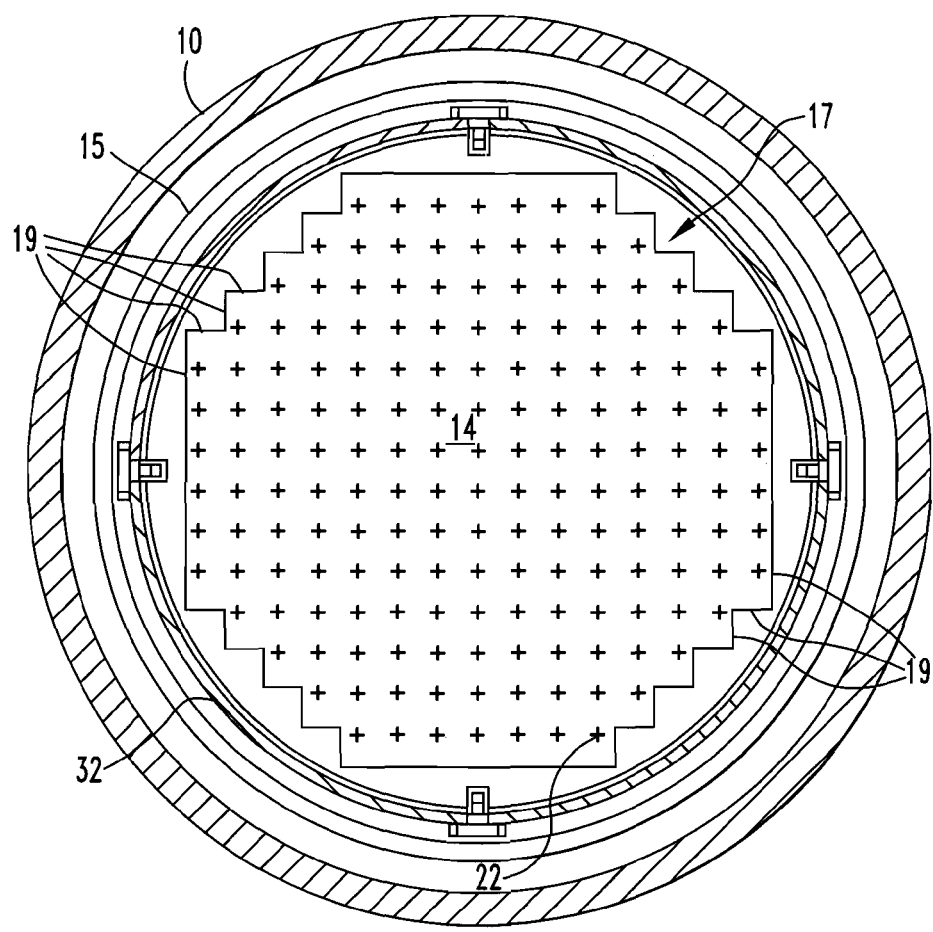
FIG. 3 is a cross-sectional to plan view of a nuclear reactor vessel showing the pressure vessel, thermal shield, core barrel, core shroud and the core fuel assemblies.

For purposes of illustration, embodiments of the disclosed concept will be described as applied to core shrouds although it will become apparent that they could also be applied to replace or otherwise eliminate corner joints between joined components of other internals assemblies (e.g., without limitation, battle-former assemblies) to address and overcome problems associated therewith (e.g., without limitation, baffle-jetting).

Directional phrases used herein, such as, for example, interior, exterior, inside, outside, top, bottom and derivatives thereof, relate to the orientation of the elements shown in the drawings and are not limiting upon the claims unless expressly recited therein.

As employed herein, the term "unitary" shall mean one single continuous piece of material that is devoid of any seems, joints or connections and which may be formed using any known or suitable method or process such as, for example and without limitation, an extrusion process.

As employed herein, the term "number" shall mean one or an integer greater than one (i.e., a plurality).

Figure 4:
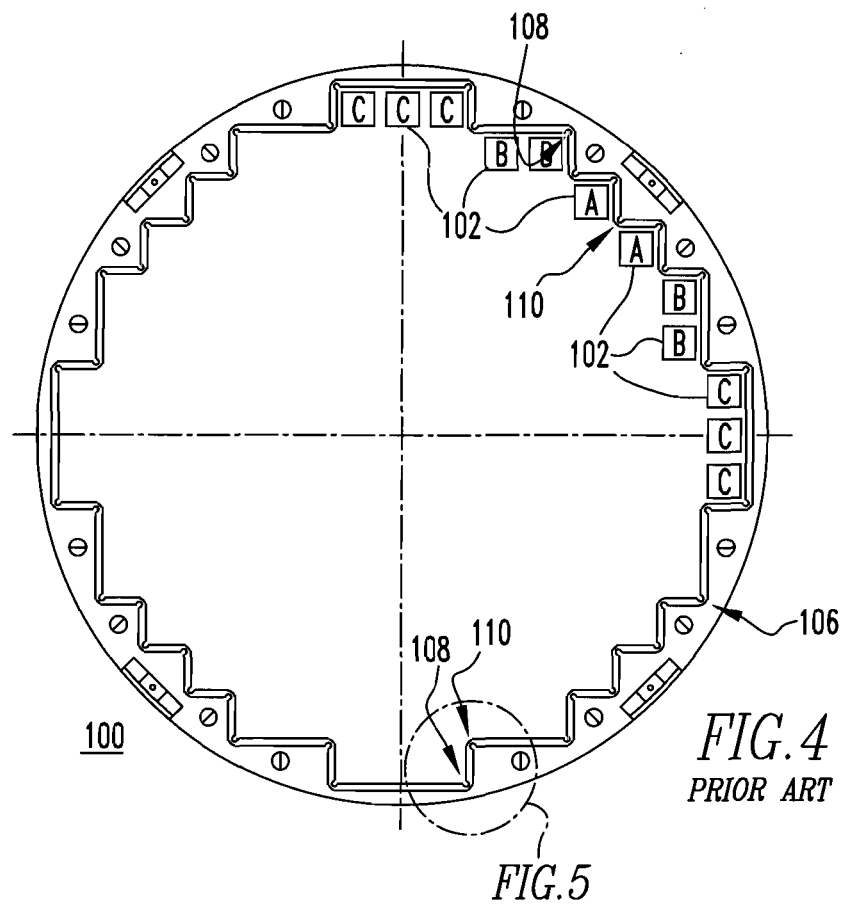
FIG. 4 is a top plan view of a core shroud and several peripheral core fuel assemblies.
Figure 5:
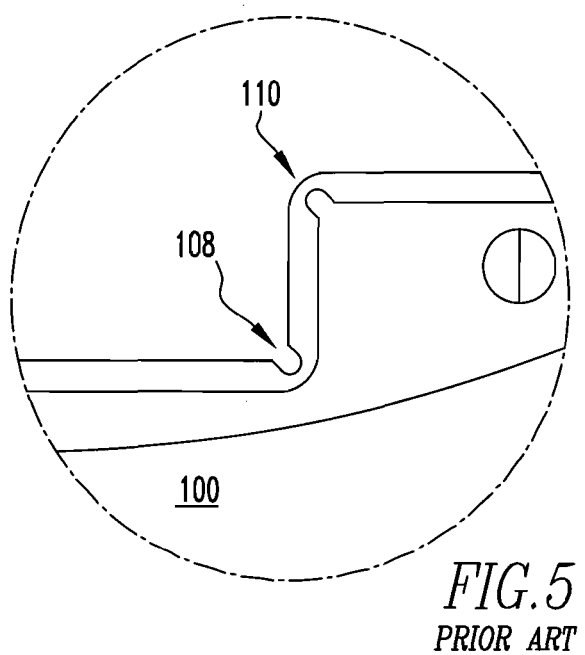
FIG. 5 is an enlarged view of a segment of FIG. 4.

FIG. 4 shows a core shroud 100. Several fuel assemblies 102 are shown in locations (generally indicated as A, B and C in FIG. 4) on the perimeter 106 of the core shroud 100 where they are adjacent to either an inner core shroud corner 108 or an outer core shroud corner 110. For example and without limitation, in the non-limiting example of FIG. 4, there are 44 locations (only 10 locations are shown for ease of illustration) where fuel assemblies 102 will be adjacent to either inside corners 108, outside corners 110, or both inside and outside corners 108,110. FIG. 5 shows an enlarged view of an inside corner 108 and an outside corner 110 of the core shroud 100.

As shown in FIGS. 6-12, the disclosed concept entails the fabrication of each core shroud corner as a unitary corner 200 such as, for example and without limitation, a unitary extrusion having the desired corner shape. The open areas associated with conventional inside and outside corners 108, 110 (FIGS. 4 and 5) are, therefore, eliminated. Such open areas can result from forming (e.g., without limitation, bending) and/or from welding the seems (not shown in FIGS. 4 and 5) where two planar portions abut and are joined to make the corner joint. Recent changes in manufacturing extrusion technology have made this possible. For example and without limitation, up to about 4.75 inch×4.75 inch×1 inch or larger full-length (e.g., without limitation, see length, L, of FIG. 6 which may be, for example and without limitation, about 180 inches (not shown to scale)) extruded shapes are possible.

Figure 6:
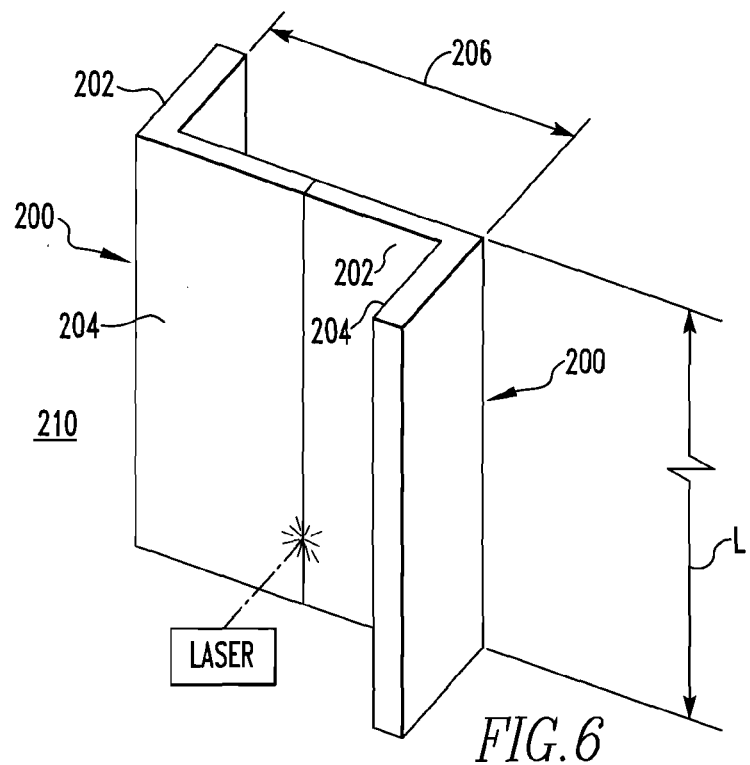
FIG. 6 is an isometric view of a pair of unitary corners for a core shroud, in accordance with an embodiment of the disclosed concept.

Thus, as shown in FIG. 6, each unitary corner 200 (two are shown) includes a first planar portion 202 and a second planar portion 204 disposed perpendicular to the first planar portion 202, and without any seem or other connection therebetween. This is particularly advantageous where, as in the example of FIG. 6, the width (e.g., without limitation, about 4.75 inch) when welded to a similar extrusion 200, is sufficiently wide to accommodate a perimeter location having a single fuel assembly 102 (see, for example, fuel assemblies 102 in locations "A" in FIG. 4). The unitary extruded shapes 200 (e.g., unitary corners) can then be laser welded or otherwise suitably joined, for example, to form a subassembly 210, as shown in FIG. 6.

Figure 7:
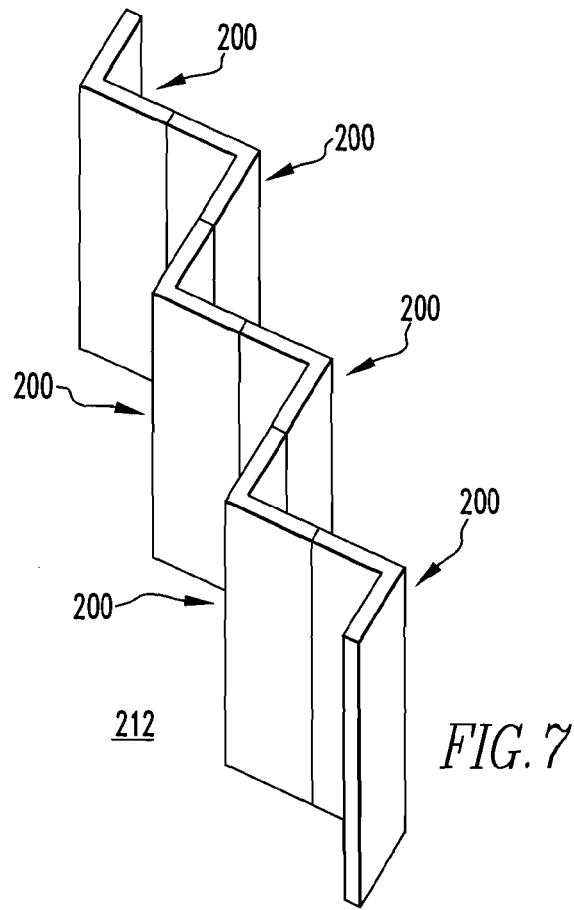
FIG. 7 is an isometric view of a subassembly, in accordance with an embodiment of the disclosed concept, wherein the subassembly comprises three pairs of unitary corners.
Figure 8:
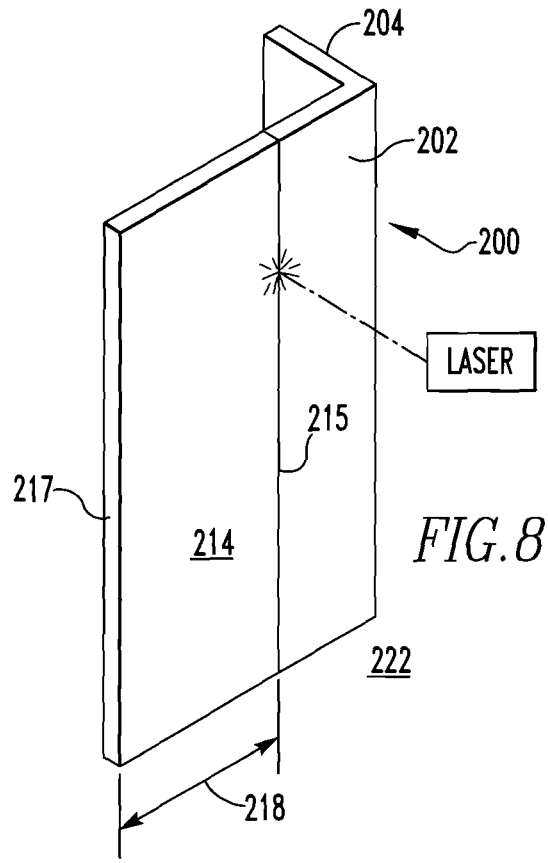
FIG. 8 is an isometric view of a subassembly, in accordance with an embodiment of the disclosed concept, wherein the subassembly comprises a unitary corner and a relatively narrow planar member.
Figure 9:
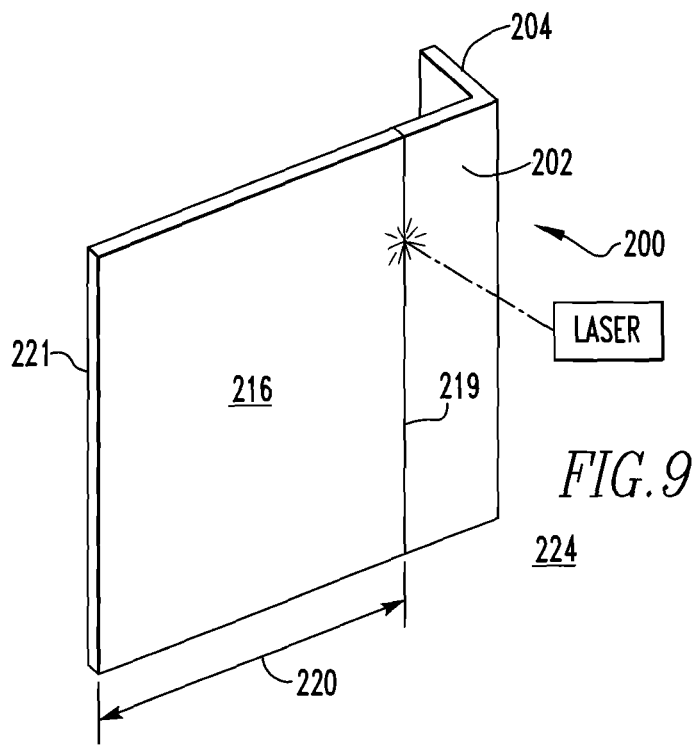
FIG. 9 is an isometric view of a subassembly, in accordance with an embodiment of the disclosed concept, wherein the subassembly comprises a unitary corner and a relatively wide planar member.

To complete the perimeter of the core shroud near the pair of fuel assemblies 102 designated as "A" in FIG. 4, continued welding of three pairs of the unitary corners 200 is completed to form a subassembly 212, as shown in FIG. 7. For the other two typical perimeter locations, which have two or three fuel assemblies in a row (see, for example, fuel assemblies 102 at the locations designated as "B" and "C" in FIG. 4), planar members 214 (FIG. 8), 216 (FIG. 9) of differing widths 218 (FIG. 8), 220 (FIG. 9), are welded to a unitary corner 200 to form subassemblies 222, 224, which are shown in FIGS. 8 and 9, respectively. Specifically, FIGS. 8 and 9 show planar members 214, 216 of widths 218, 220, respectively, that can be laser welded or otherwise suitably joined to a unitary corner 200 to accommodate core fuel assembly locations "B" and "C," respectively, of FIG. 4. In the example of FIG. 8, the first planar member 214 includes opposing edges 215, 217 and a first width 218 measured by the distance therebetween, whereas the second planar member 216 of FIG. 9 has opposing edges 219, 221 and a second width 220 therebetween, which is greater than the first width 218 of first planar member 214.

Figure 10:
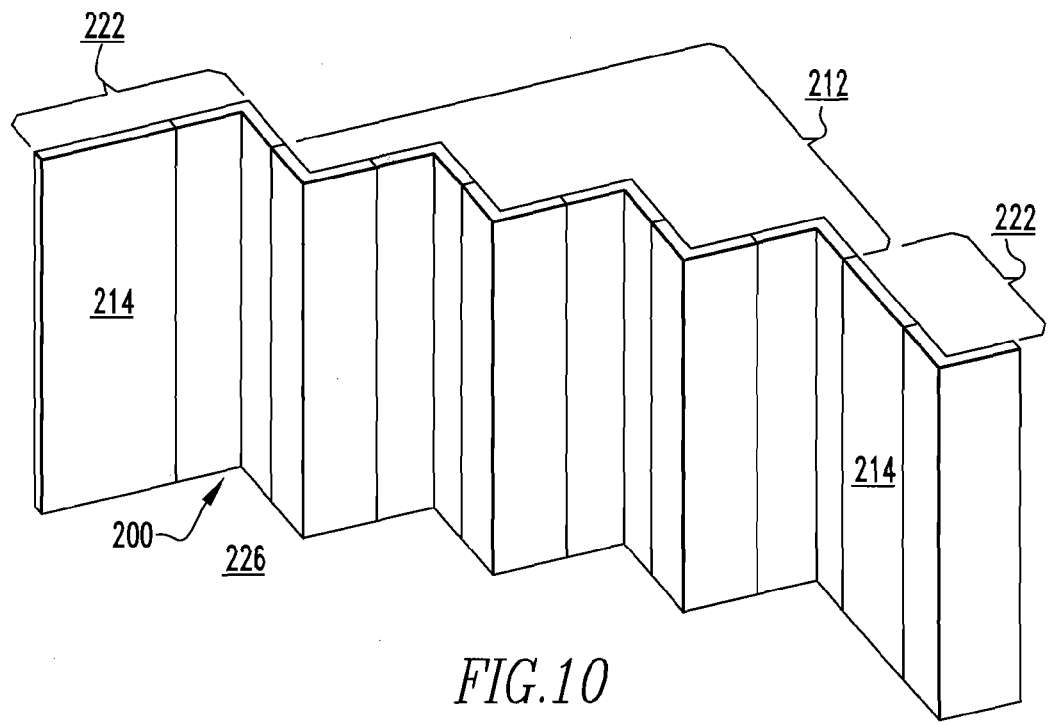
FIG. 10 is an isometric view of another core shroud subassembly in accordance with the disclosed concept.
Figure 11:
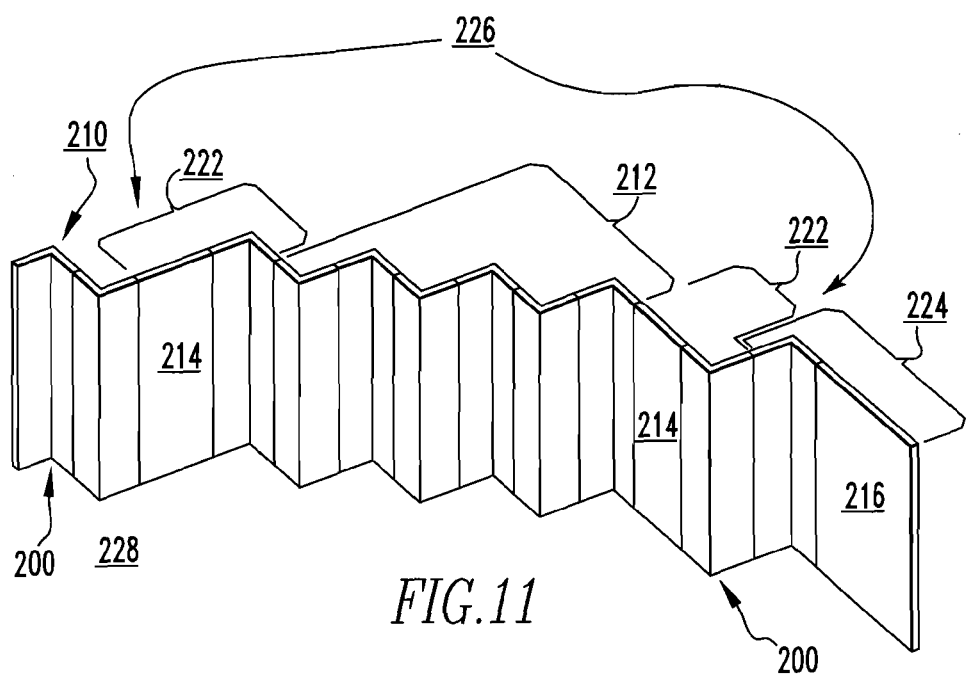
FIG. 11 is an isometric view of a quarter perimeter segment of a core shroud in accordance with the disclosed concept.
Figure 13A:
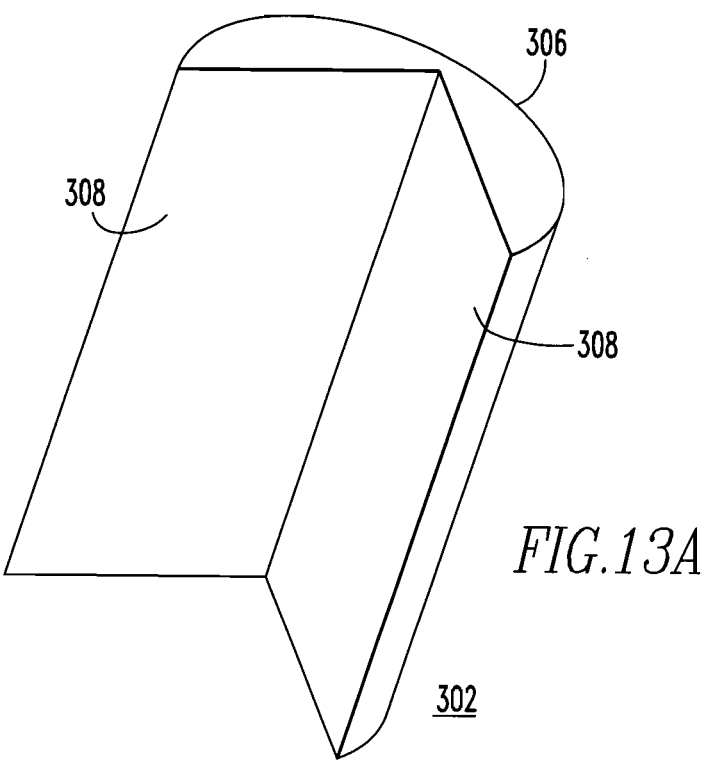
FIGS. 13A and 13B are front and back isometric views, respectively, of a flow deflector for use on the interior of a core shroud corner in accordance with another embodiment of the disclosed concept.
Figure 13B:
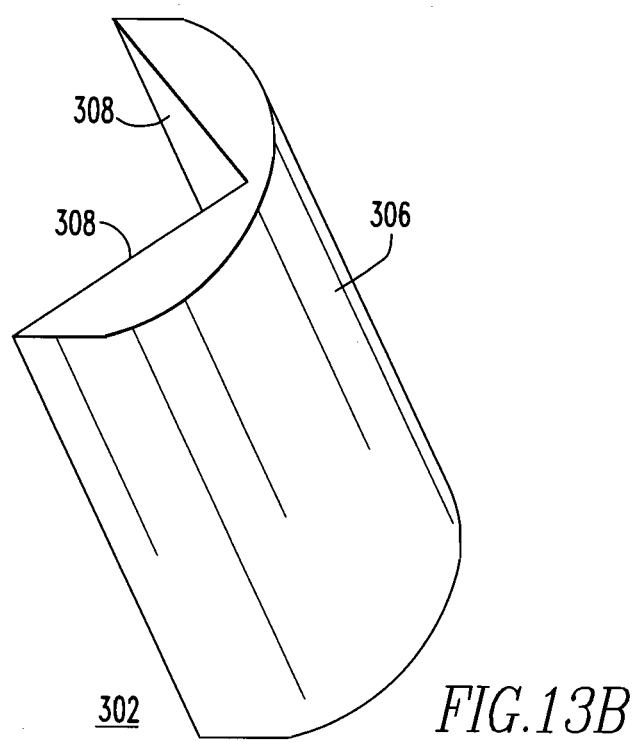

The exemplary method of forming the perimeter 106 of the core shroud 100 (FIG. 4), involves welding or otherwise suitably joining two of the subassembly 222, shown in FIG. 8, to the subassembly 212, shown in FIG. 7, resulting in the subassembly 226, shown in FIG. 10. Lastly, to complete a quarter perimeter segment, or subassembly 228, of the core shroud 100 (FIG. 4; also referred to generally as 300 in FIG. 12), the unitary corner subassembly 210 of FIG. 6 and the subassembly 224, shown in FIG. 9, are welded or otherwise suitably joined to subassembly 226 of FIG. 10. In the example shown and described herein, each of the quarter perimeter segments 228 includes eleven of the unitary corners 200, two of the first planar members 214, and one of the second planar members 216, as shown in FIG. 11. Finally, four of the quarter perimeter segments 228 are welded or otherwise suitably joined together to form the complete core shroud 300, shown in FIG. 12 (see also core shroud 100 of FIG. 4).

It will be appreciated that any known or suitable alternative configuration, number and/or assembly sequence of components (e.g., without limitation, unitary corners 200; first planar members 214; second planar members 216) and subassemblies (e.g., without limitation 210, 212, 222, 224, 226, 228) could be employed, without departing from the scope of the disclosed concept.

It will also be appreciated that while components (e.g., without limitation, unitary corners 200; first planar members 214; second planar members 216) are preferably welded using laser technology, as generally indicated in simplified form in FIG. 6, that any known or suitable alternative method, process or mechanism could be employed to suitably join the core shroud components (e.g., without limitation, unitary corners 200; first planar members 214; second planar members 216) and/or subassemblies (e.g., without limitation 210, 212, 222, 224, 226, 228).

Among other advantages, the disclosed concept eliminates the inside and outside corner void areas associated with the known core shroud designs. The void areas are the result of extensive machining, bending and/or forming operations. The disclosed concept provides a unitary corner and therefore eliminates all seems at the corner, and also eliminates welding corner joints that are difficult to inspect due to lack of accessibility. The only welds are at locations away from the corners, which are substantially flat and/or relatively easy to access and facilitate inspection.

Additionally, in stages, each unitary corner extrusion 200 can be laser welded or otherwise suitably joined to like extrusions 200 (see, for example, FIGS. 6 and 7) and/or associated planar members 214, 216 (see, for example, FIGS. 8 and 9). Each of the unitary corners 200 may also be substantially identical, with the first planar portion 202 of one unitary corner 200 being joined to the second planar portion 204 of another unitary corner 200, in order that the unitary corners 200 are disposed side-by-side in an alternating opposing relationship (best shown in FIG. 7). Moreover, it will be appreciated that the assembly method can employ rigid-like tooling and/or fixtures (not shown) to hold the extruded unitary corners 200, planar members 214, 216 and/or subassemblies 210, 212, 222, 224, 226, 228. Therefore, weld distortion, which can be caused for example by heat, is minimized. Furthermore, compared to conventional welding processes that use consumable electrodes, laser welding results in minimal heat input, which should further result in better dimensional control. This will improve core cavity dimensions, particularly at the final stage of welding the four quarter perimeter segments 228 (FIGS. 11 and 12), whereas the current process results in significant machining being required after welding, in order to meet core cavity dimensional requirements.

The extruded unitary corner design of the disclosed concept eliminates the welding of corner joints altogether and, therefore, eliminates a significant amount of machining work and time and cost associated therewith. Additionally, due to the possibility of less machining being necessary after welding, a further savings may be available by way of the ability to potentially use thinner extruded shapes. The possibility exists for the aforementioned subassemblies 210, 212, 222, 224, 226, 228 to be fabricated by qualified suppliers, in order that partial or full core shroud assemblies could be shipped to a designated manufacturing facility for final assembly or completion of core shroud 100 (FIG. 4; see also core shroud assembly 300 of FIG. 12).

It will also be appreciated that the potential exists to incorporate the disclosed unitary corner concept with respect to other reactors internals assemblies (e.g., without limitation, baffle-former assembly corner joints (not shown)). For example and without limitation, an extruded unitary corner could be retro-fitted to an existing baffle-former design to eliminate corner joints between baffle plates (not shown) of a baffle-former assembly (not shown). Thus, the potential for undesirable "baffle jetting" is eliminated. "Baffle jetting is a result of water jetting from inside the baffle-former core cavity toward the direction of the core as a result of gaps or openings in the corner joint.

Figure 14:
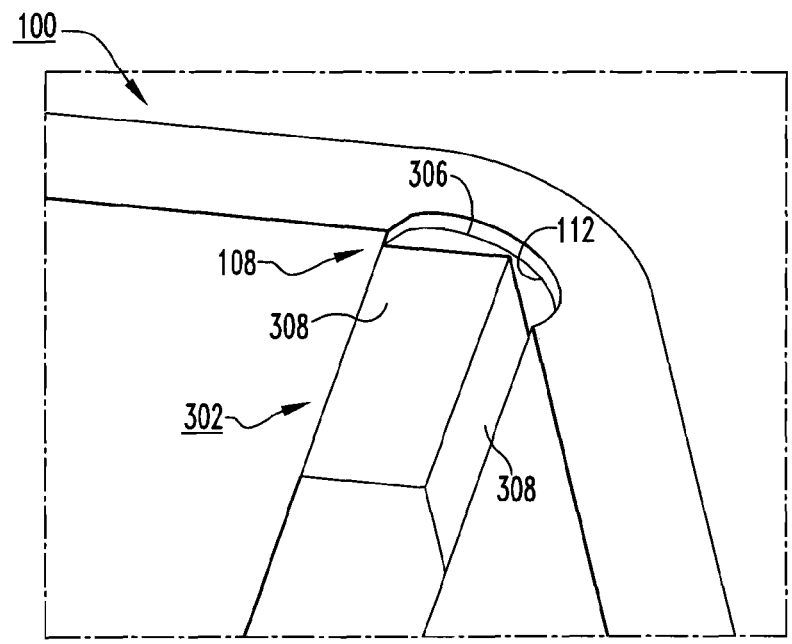
FIG. 14 is an enlarged isometric view of an interior portion of a corner of a core shroud employing the interior flow deflector of FIGS. 13A and 13B.
Figure 15:
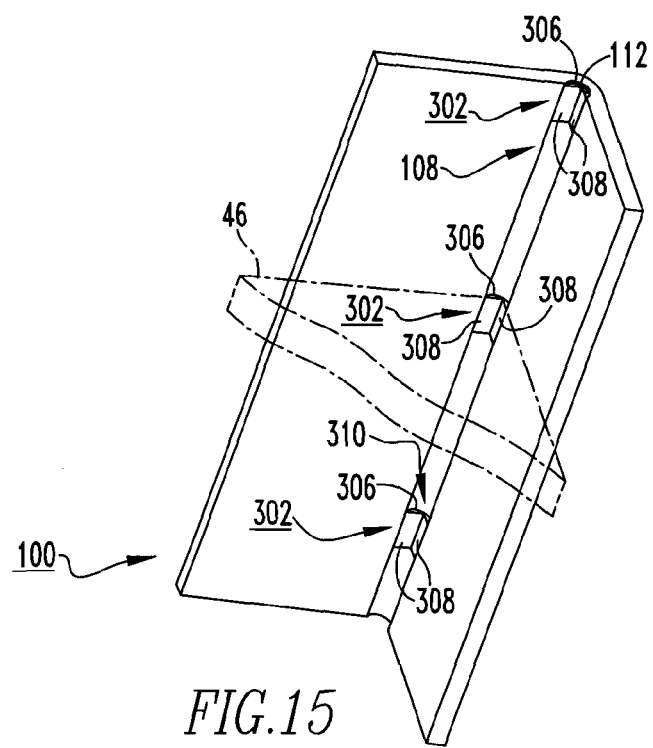
FIG. 15 is an isometric view of the interior of the core shroud corner of FIG. 14, shown employing three interior flow deflectors and further showing a portion of a fuel assembly grid in phantom line drawing.
Figure 16A:
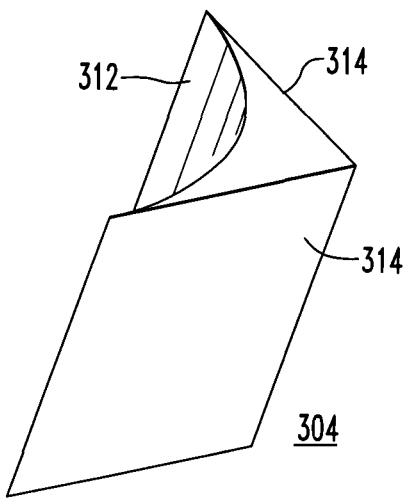
FIGS. 16A and 16B are isometric views of opposing sides of a flow deflector for use on the exterior of a core shroud corner in accordance with another embodiment of the disclosed concept.
Figure 16B:
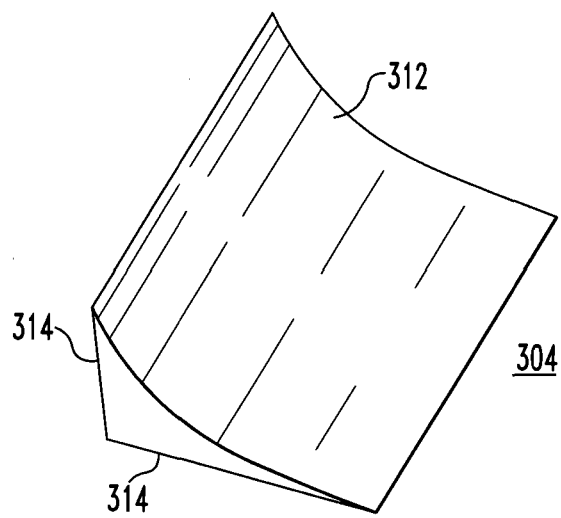

FIGS. 13A-15 and 16A-18 respectively show interior flow deflectors 302 and exterior flow deflectors 304, 304', in accordance with non-limiting example alternative embodiments of the disclosed concept. In the example of FIGS. 13A-15, the flow deflector 302, sometimes referred to as a "hockey puck"

type of insert, is structured to be installed in the interior junction 112 of the core shroud corner 108, as shown in FIGS. 14 and 15. Specifically, each of the flow deflectors 302 includes a curved portion 306 and a number of substantially flat portions 308 (two are shown in FIGS. 13A-15). The curved portion 306 is structured to mate with the curved interior junction 112 of the core shroud interior corner 108, as shown in FIGS. 14 and 15. Thus, it will be appreciated that the dimensional characteristics of the flow deflector 302 (e.g., without limitation, height of the flow deflector 302) can be established to be consistent with, for example, the height of fuel assembly grids 46 (e.g., without limitation, fuel assembly grids 46, partially shown in phantom line drawing in FIG. 15). Thus, not only do the flow deflectors 302 deflect the flow of coolant so as to reduce axial velocity and resist undesired flow bypass, for example, by filling an open area in the corner (e.g., 108), but they can also serve to further support the grids 46. To secure the flow deflector 302 to the core shroud 100, a fillet weld (indicated generally be reference numeral 310 in FIG. 15) may be used, as shown for example, in FIG. 15.

Figure 17:
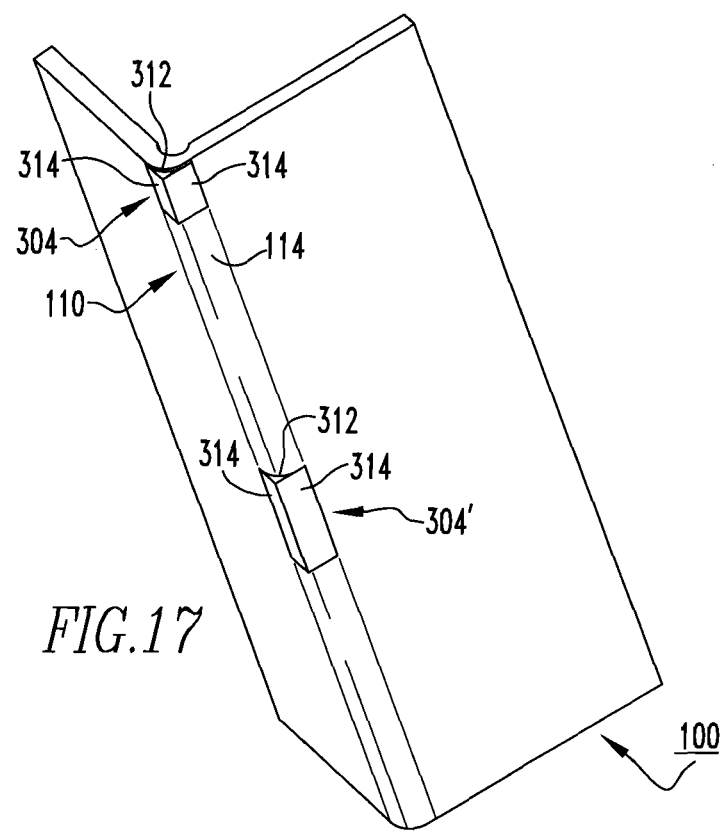
FIG. 17 is an isometric view of the exterior of a core shroud corner, shown employing two exterior flow deflectors.
Figure 18:
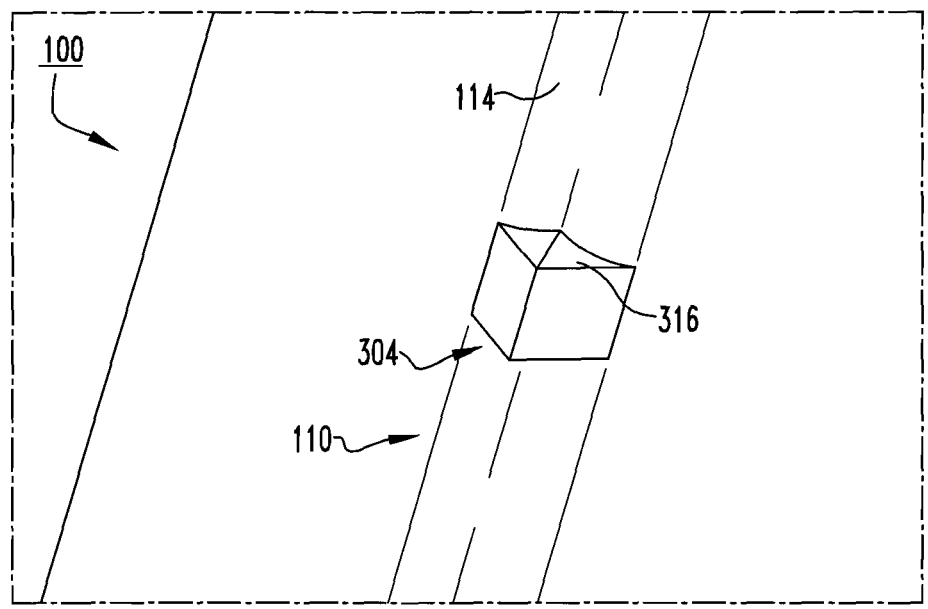
FIG. 18 is an enlarged isometric view of an exterior portion of the core shroud corner of FIG. 17, shown employing a flow deflector in accordance with another embodiment of the disclosed concept.

Implementation of the aforementioned exterior flow deflector 304 and 304' for exterior corners 110 of the core shroud 100 is shown in the non-limiting examples of FIGS. 16A-17 and 18, respectively. As with the interior flow deflectors 302, previously discussed, the height of the exterior flow deflectors 304, 304' can be made to be consistent with the height of the fuel assembly grids 46 (partially shown in phantom line drawing in FIG. 15). Each exterior flow deflector 304, 304' preferably includes a curved portion 312 and a number of substantially flat portions 314 (two are shown) disposed generally opposite the curved portion 312. The curved portion 312 is structured to mate with, and be suitably joined (e.g., without limitation, welded) to, the curved exterior junction 114 of the exterior corner 110 of the core shroud, as shown in FIGS. 17 and 18. It will, however, be appreciated that any known or suitable alternative number, shape and/or configuration of flow deflectors (not shown) other than, or in addition to, those that are shown and described herein, could be employed without departing from the scope of the disclosed concept. For example and without limitation, FIG. 17 shows two different exterior flow deflectors 304, 304' disposed on the exterior corner 110 of the core shroud 100, each of which has a different length. Additionally, as shown in exaggerated form in FIG. 18, the flow deflector 304 may include a chamfer 316. Such chamfer 316, which may for example, be formed as part of a fillet weld, would help, for example, to avoid undesired interaction (e.g., without limitation, a "snag") with a grid during fuel assembly loading and unloading. It will also be appreciated that such flow deflectors (e.g., without limitation, 302, 304, 304') could be incorporated independently (e.g., as a separate solution from the disclosed unitary corner concept), for example, with an existing core shroud design, to improve the flow-related problems associated with the corner joints thereof. It will, therefore, further be appreciated that such flow deflectors (e.g., without limitation, 302, 304, 304') are not required in a least some embodiments in accordance with the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A core shroud comprising:
a number of planar members;
a number of unitary corners; and
a number of subassemblies each comprising a combination of said planar members and said unitary corners,
wherein each of said unitary corners comprises a unitary extrusion.

2. The core shroud of claim 1 wherein each of said unitary corners is substantially identical.

3. The core shroud of claim 1 wherein each unitary extrusion including includes a first planar portion and a second planar portion disposed perpendicularly with respect to the first planar portion.

4. The core shroud of claim 1 wherein at least one of said subassemblies comprises a plurality of said unitary corners; and wherein the first planar portion of one of said unitary corners is joined to the second planar portion of another one of said unitary corners, in order that said unitary corners are disposed side-by-side in an alternating opposing relationship.

5. The core shroud of claim 1 wherein said planar members include first planar members and second planar members; wherein each of said first planar members and said second planar members includes a first edge, a second edge disposed opposite and distal from the first edge, and a width measured by the distance between the first and second edges; and wherein the width of each of said second planar members is greater than the width of each of said first planar members.

6. The core shroud of claim 5 wherein at least one of said subassemblies comprises one of said unitary corners and one of said first planar members; and wherein the first planar portion of said unitary corner is joined to a corresponding one of the first and second edges of said first planar member.

7. The core shroud of claim 5 wherein at least one of said subassemblies comprises one of said unitary corners and one of said second planar members; and wherein the first planar portion of said unitary corner is joined to a corresponding one of the first and second edges of said second planar member.

8. The core shroud of claim 5 wherein a plurality of said subassemblies are combined to form a quarter perimeter segment of said core shroud; and
wherein each quarter perimeter segment includes eleven of said unitary corners, two of said first planar members, and one of said second planar members.

9. The core shroud of claim 1, further comprising a number of flow deflectors; wherein each of said unitary corners includes a curved interior junction and a curved exterior junction; wherein each of said flow deflectors includes a curved portion and a number of substantially flat portions disposed opposite the curved portion; and wherein said curved portion is structured to mate with a corresponding one of the curved interior junction and the curved exterior junction.

10. A nuclear reactor comprising:
a pressure vessel;
an annular core barrel seated within and supported by the pressure vessel; and
a core shroud supported within the core barrel, the core shroud comprising:
a number of planar members,
a number of unitary corners, and
a number of subassemblies each comprising a combination of said planar members and said unitary corners,
wherein each of said unitary corners comprises a unitary extrusion.

11. The nuclear reactor of claim 10 wherein each of said unitary corners of said core shroud is substantially identical.

12. The nuclear reactor of claim 10 wherein said planar members of said core shroud include first planar members and second planar members; wherein each of said first planar members and said second planar members includes a first edge, a second edge disposed opposite and distal from the first edge, and a width measured by the distance between the first and second edges; and wherein the width of each of said second planar members is greater than the width of each of said first planar members.

13. The nuclear reactor of claim 12 wherein a plurality of said subassemblies are combined to form a quarter perimeter segment of said core shroud; and wherein each quarter perimeter segment includes eleven of said unitary corners, two of said first planar members, and one of said second planar members.

14. The nuclear reactor of claim 10 wherein said core shroud further comprises a number of flow deflectors; wherein each of said unitary corners of said core shroud includes a curved interior junction and a curved exterior junction; wherein each of said flow deflectors includes a curved portion and a number of substantially flat portions disposed opposite the curved portion; and wherein said curved portion is structured to mate with a corresponding one of the curved interior junction and the curved exterior junction.

15. The nuclear reactor of claim 14, further comprising a number of grids disposed within said core shroud; and wherein said substantially flat portions of said flow deflectors are structured to engage and support a portion of a corresponding one of said grids.

\* \* \* \* \*